United States Patent [19]

Jasper et al.

[11] Patent Number: 4,882,899
[45] Date of Patent: Nov. 28, 1989

[54] HARVESTER REEL TINE AND BAT ASSEMBLY

[75] Inventors: Edward P. Jasper; Thomas G. Truckenbrod, both of Mendota, Ill.

[73] Assignee: HCC, Inc., Mendota, Ill.

[21] Appl. No.: 206,828

[22] Filed: Jun. 15, 1988

[51] Int. Cl.⁴ ............................................. A01D 57/02
[52] U.S. Cl. ......................................... 56/220; 56/400
[58] Field of Search ........................... 56/220, 227, 400

[56] References Cited

U.S. PATENT DOCUMENTS

| 2,256,255 | 9/1941 | Bangert | 56/400 |
| 2,719,401 | 10/1955 | Erickson | 56/400 |
| 3,066,470 | 12/1962 | Johnston | 56/400 |
| 3,145,520 | 8/1964 | Hume | 56/220 |
| 3,175,347 | 3/1965 | Scheidenhelm | 56/220 |
| 3,468,109 | 9/1969 | Reimer | 56/400 |
| 3,613,346 | 10/1971 | Hubbard | 56/400 |
| 3,616,631 | 11/1971 | Quam | 56/400 |
| 3,771,299 | 11/1973 | Gradwohl | 56/220 |
| 3,796,030 | 3/1974 | Neal | 56/400 |
| 3,902,305 | 9/1975 | Gibson | 56/220 |
| 4,016,710 | 4/1977 | May | 56/220 |
| 4,255,921 | 3/1981 | Kirby | 56/220 |
| 4,472,930 | 9/1984 | Smith | 56/400 |
| 4,706,448 | 11/1987 | Gessel | 56/400 |

FOREIGN PATENT DOCUMENTS 1347900 10/1987 U.S.S.R. ................................. 56/220

Primary Examiner—John Weiss
Attorney, Agent, or Firm—Martin Fruitman

[57] ABSTRACT

An improved harvester pickup reel tine and bat structure results in light weight, ease of assembly and non-snagging operation. A one-piece tine and attachment is formed by molding a plastic tine integral with a split ring to clamp it onto the support tube. A single split in the ring and the integral construction permits an assembly with no protrusions on the rear surface of the reel which otherwise catches on accumulated material in the harvester. An alternate embodiment includes extension wings which interlock with adjacent structures to form a continuous bat thus affording the reel assembly which is convertible between a structure with or without bats.

11 Claims, 4 Drawing Sheets

HARVESTER REEL TINE AND BAT ASSEMBLY

SUMMARY OF THE INVENTION

This invention deals generally with harvesters, and more specifically with rake teeth and their fastening onto a rotating reel.

Although plastic tines on harvester reels have become relatively common items, it has been typical to construct and attach them to the reel in much the same manner as the previously used metal tines. This usually means they are attached to the tubes or bats by using bolts or machine screws which pass through holes preformed in the tines and penetrating the tube or bat. Several tubes or bats are then attached to a series of spaced spindles or arms which form the reel.

In practical terms every bolt or screw penetrating the support tube or bat causes two problems. The first is that every hole in the tine support tube weakens the support, therefore requiring a larger, heavier structure to attain the same strength. Somewhat related to this problem is that if the tine attachment system uses threaded holes in the support tube, then there is a likelihood of eventually stripping the threads while replacing tines or breaking off the screw head requiring drilling out the screw. Both cases typically lead to enlarging the hole for larger threads, and that, of course, further weakens the support tube.

The second problem resulting from screw or bolt attachment of the tine to the support tube is somewhat more subtle. It shows up in field operation when screws that protrude from the smooth surface of the tube or tine cause snagging of crop and crop entanglement on the reel. Bolts which penetrate through both sides of a tube are the worst offenders, since they have a bolt head with corners at one end and a bolt protruding through a nut at the other end, but even relatively flat machine screw heads will initiate the problem of crop entanglement by catching the crop.

This problem is further aggravated as the backsides of the support tubes and tines most closely approach the compacting crop in the harvester at the rear of the reel as it is pushing crop into the harvester. At that point of the reel movement the backside of the support tube is likely to actually engage crop moving sideways in the harvester auger, and any protrusion on the assembly is very likely to snag crop material.

Of course, the problem is similar in regard to the structure of the tine itself. In order to prevent crop catching on the tine, it must itself have rounded corners and no protruding nuts, bolts or screws.

Moreover, any system of attachment of a bat to the reel must meet the same requirements of no protrusions. A bat is best described as a flat elongated surface which is oriented so that it is in the same approximate plane as the upper parts of the finger portions of the tines, generally extends in one dimension along the length of the tines and in the other direction extends fully from tine to tine filling the space between them. The bat serves to separate and deflect standing crop toward the harvester's cutters, while the tines rake the crop into the harvester.

The improved bat and tine structure of the harvester reel of the present invention addresses the problem of crop entanglement in a new manner, by using a unified structure which combines the tine, the attachment and, if included, the bat. Also, by using only a single shielded screw for attachment of each tine, with that protrusion on the front of the tube, it succeeds in minimizing entanglement by having the entire rear, and in fact about three-quarters of the circumference of the support tube, completely free of any protrusion which might snag the crop material.

The key to this success is the unified structure of the tine itself. Each tine is constructed of molded plastic, all edges are rounded and it is combined with and integral with a split ring clamp which attaches it to a simple support tube. Moreover, the split ring has only one protrusion, uses only one screw to clamp it closed and that screw is not only shielded from crop entanglement, but, more important, it is also located on the frontside of the support tube where it inherently has little contact with the crop which is cut by the sickle.

The tine also uses only a single hole or recess in the support tube to lock the tine in place. This hole is located in line with the finger axis of the tine, and a plug which is an integral part of the formed tine protrudes into it to lock the tine in place. Moreover, the hole or recess in the tube is located at a point which has low stress during normal operation. The tine itself is oriented relative to the support tube so that it extends radially downward from the tube, which further reduces the likelihood of entanglement since the radial orientation causes less disturbance to the crop as the tine is being lifted up and away from the crop at the rear of the reel.

An alternate construction of the tine includes two integrally molded wing extensions on either side of the finger. These wings are essentially planar in structure and are oriented in the same plane as the tine fingers and a radius of the support tube. Moreover, the wings are dimensioned so that together they span the spacing between tines on the support bar, and one wing has a slot while the other has a matching land. A full assembly of multiple tines with interlocking wings therefore forms a bat structure over the full length of the support bar.

The full reel assembly is further enhanced by the use of a unique bearing to hold the support bars which rotate relative to the spindles on the reel in order to maintain the tine fingers pointed downward toward the ground at all times. This bearing assembly is composed of only two identical molded plastic parts with interlocking groove and land configurations on one end outside of the bearing circumference and a clearance bolt hole and locking protrusion on an extension on the other side of the bearing circumference The clearance hole accommodates a bolt which both locks the bearing halves together and attaches the bearing to the reel spindle while the locking protrusion fits into open end slots in the extension to prevent movement in any direction, which prevents binding on the tube.

The combination of the integral finger, split ring and bat with a simple support tube and a lightweight plastic bearing furnishes a particularly rugged, lightweight and tangle free reel structure which is also easier to assemble and less expensive to construct. Furthermore, field removal or installation of a tine is exceptionally fast, since it requires only the use of one screw and the flexing of the split holding ring to slip the tine around the support tube, and with the two alternate embodiments, that is, with and without wings to form bats, the present invention meets the requirements of the worldwide market.

DETAILED DESCRIPTION OF THE INVENTION

Figure 1:
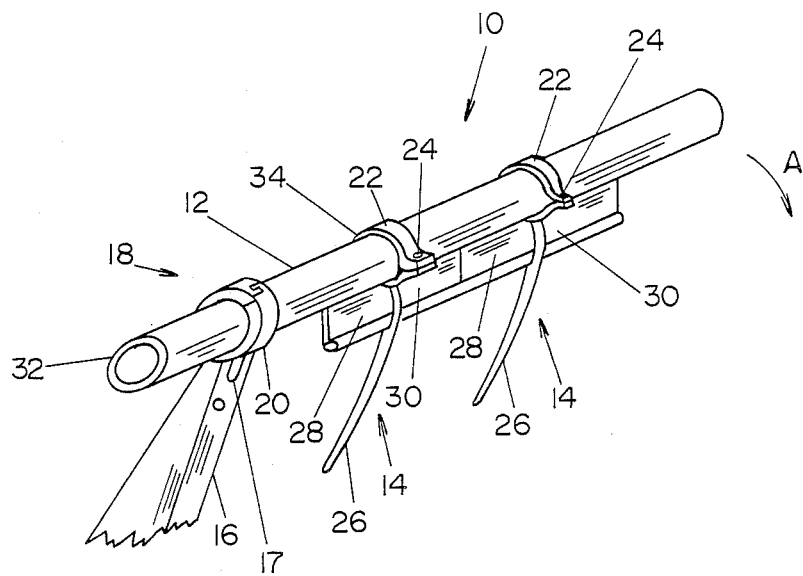
FIG. 1 is a perspective view of the preferred embodiment of the invention showing two tines assembled on a support tube held with the bearing of the invention.

The preferred embodiment of the invention is shown in FIG. 1 in which harvester pickup reel tine and bat assembly 10 includes support tube 12 on which tines 14 are mounted.

Assembly 10 is only a short section of tubes 12 which together form a typical reel on a harvester, each assembly 10 being supported near the outside circumference of the reel (not shown) by arms 16 of a star shaped spindle. Support tube 12 is held on the end of the several arms 16 along its length by bearing 18 which is actually composed of two identical interlocking halves 20.

Each tine 14 is held onto support tube 12 by split ring section 22 which is held tightly closed around support tube 12 by connector screw 24. Each tine 14 also includes finger section 26 which extends from split ring section 22 approximately radially downward and curves away from the front side of split ring section 22 which includes screw 24.

Tines 14 also include wing structures 28 and 30 which are attached to finger sections 26 and extend between tine 14 to form a continuous bat structure. In actual use, another tine would be located between arm 16 and the two tines shown and more tines would be used to completely fill support tube 12 with tines over its entire length.

FIG. 1 is a view of assembly 10 from the front side of the harvester reel when assembly 10 is near the top of its typical rotation path. Its motion would normally be in the direction of arrow A, but the most critical portion of its rotation path is that portion which is almost diametrically opposite of the position shown. It is at that location that backside 32 of assembly 10 is most likely to contact the compressed crop already within the harvester, and it is at that time that assembly 10 of the present invention demonstrates its greatest benefit.

Since the only significant protrusion of tine 14 from support tube 12 is the connector section into which screw 24 is attached on the front side, there is absolutely nothing on backside 32 of support tube 12 other than thin band section 34 of split ring section 22 which itself has rounded edges. Therefore, there is nothing on the back of assembly 10 to catch on crop material and cause entanglement on the harvester reel. In fact, the surface of assembly 10 for virtually three quarters of its circumference, from wing sections 28 and 30 around the back to screw 24 on the front side, has nothing which would snag any crop. Bearing 18 likewise has rounded edges to prevent the crop from snagging on it.

Figure 2:
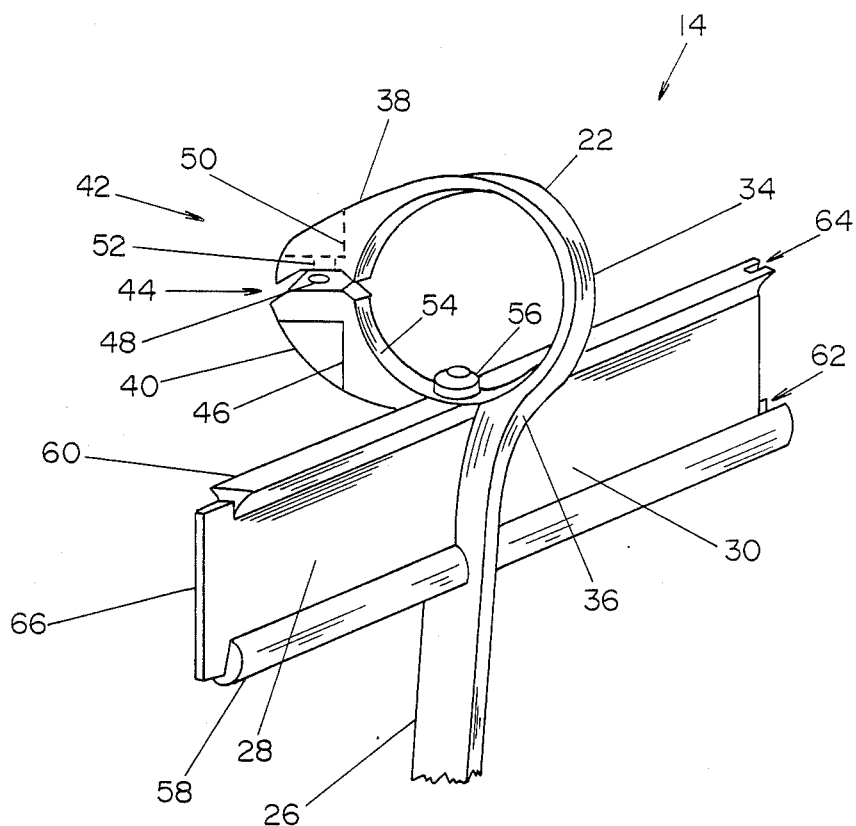
FIG. 2 is a perspective view of one embodiment of a tine with the wing extensions used to form a bat.

FIG. 2 is a perspective view of the preferred embodiment of tine 14 of the invention without the full length of finger section 26 being shown.

Tine 14, typically molded of 66 Nylon made by E. I. Dupont DeNemours & Co. or similar material, includes split ring section 22 to which finger section 26 is attached in an approximately radial orientation to the circle of split ring 22 and wing sections 28 and 30 which extend transversely from finger section 26 at its base 36 near split ring section 22. Split ring section 22 has two end sections 38 and 40 which form connector section 42 around split 44.

End section 40 has cutout 46 and hole 48, while end section 38 has cutout 50 and hole 52. In use, screw 24 (FIG. 1) is inserted into cutout 50, through hole 52 and tightened into smaller hole 48. The screw head is therefore shielded by cutout 50 and the point or nut by cutout 46. It is this construction which avoids entanglement on clamping screw 24.

More important is the fact that connector section 42 is oriented on the front of assembly 10 when it is on the harvester reel. That leaves the entire backside of tine 14 completely free of anything which might snag crop. All the way from connector section 42 over the top and beyond band section 34 of split ring 22 to base section 36, there is only the rounded edges of thin band section 34.

Band section 34 does not require great thickness and its rounded edges do not permit crop entanglement. Band section 34 needs only to be strong enough in tension to not be distorted by torque applied to finger 26 and to be flexible enough so that, without damage to it, end sections 38 and 40 can be spread apart enough to slip over support tube 12 (FIG. 1). Band section 34 must therefore flex enough to permit end sections 38 and 40 to separate by at least the inside diameter of split ring 22.

Figure 3:
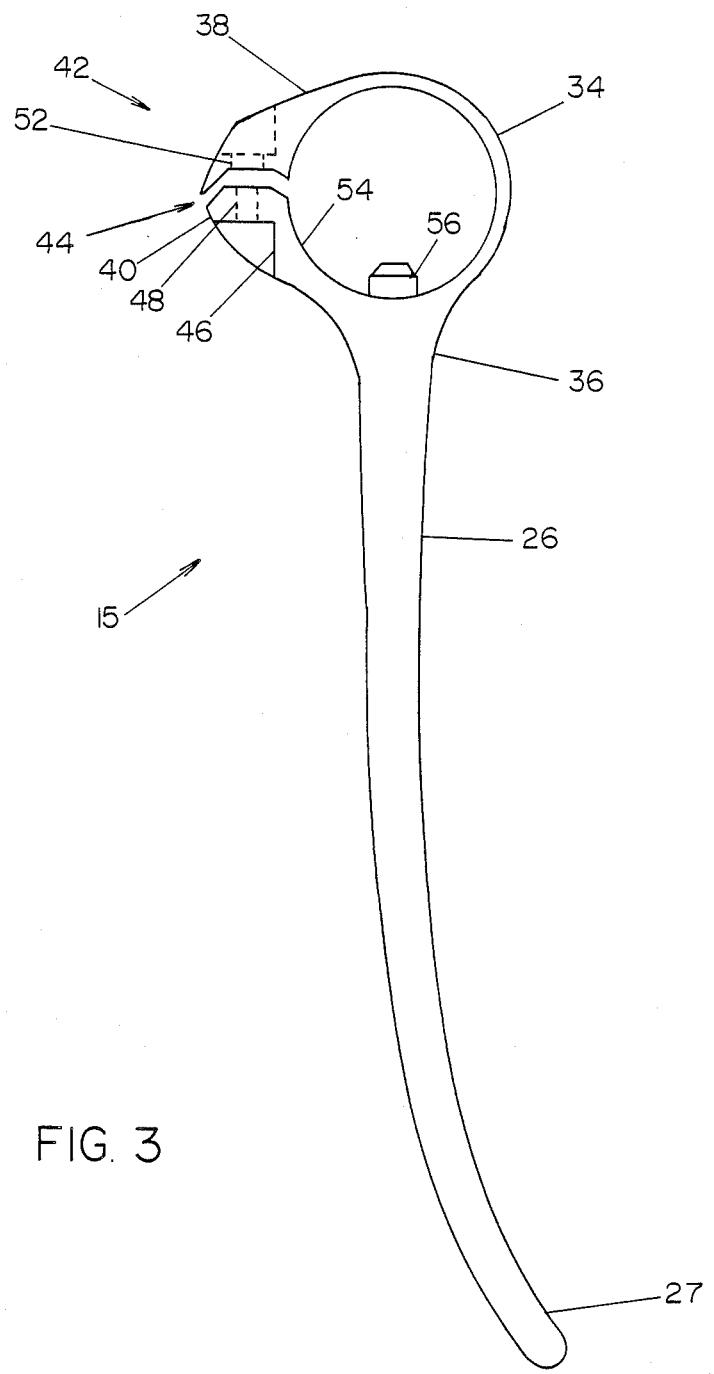
FIG. 3 is a side view of an alternate embodiment of the tine of the invention.

Tine 14 is located and held in place on support tube 12 by protrusion 56 on inside surface 54 of split ring 22. As also seen in the embodiment of FIG. 3 protrusion 56, which fits into a matching hole in support tube 12, is essentially a cylinder protruding from inside surface 54 adjacent to base 36 of finger 26. Protrusion 56 protrudes inward essentially radially at least the thickness of the wall of support tube 12, and also has a chamfer at its top edge to ease insertion into the holes on support tube 12. Once protrusion 56 is inserted into such a hole and end sections 38 and 40 are clamped together by screw 24, tine 14 is locked solidly in place on support tube 12.

FIG. 2 also shows a reinforcement structure for stiffening wings 28 and 30. This reinforcement is accomplished by increasing the thickness of the wings near one or the other edge. While two reinforcing structures 58 and 60, at the bottom and top respectively of wings 28 and 30, are shown, one such reinforcing structure would be sufficient. Moreover, while specific shapes are shown these also are not critical.

One advantage of the reinforcing structure is that it also permits a simple wing interlocking system. As seen in FIG. 2, slots 62 and 64 formed in reinforcing sections 58 and 60 are designed to fit around land section 66. Thus, the wing structures of adjacent tines interlock with each other and form a continuous bat structure as shown in FIG. 1. To accomplish this, the spacing of the holes on support tube 12 need only be correlated with the total length of the wings.

FIG. 3 shows an alternate embodiment of the tine of the present invention in which tine 15 differs from tine 14 of FIG. 2 only in the absence of wing structures, and all number designations are the same as FIG. 2. FIG. 3 does, however, show the curvature of finger section 26 toward tip 27. This curvature puts tip 27 on a radius more remote from the radius of split 44 than the radius which locates finger section base 36. It is this configuration which determines that connector section 42 is at the front of the tine and that smooth band section 34 is at the rear.

Figure 4:
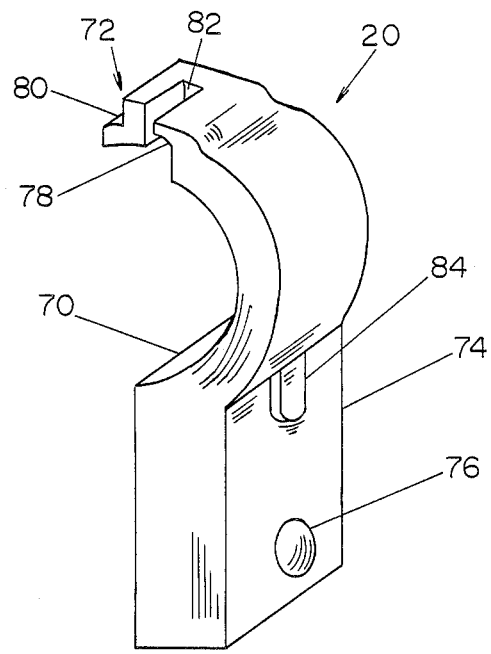
FIG. 4 is a perspective view of one half of the bearing of the invention.

FIG. 4 shows one half 20 of the two identical halves of interlocking bearing 18 of the present invention. The halves are molded of material such as nylon or similar engineering plastics and are shaped to encircle support tube 12 (FIG. 1) when the two halves are fitted together.

Bearing half 20 includes inside bearing surface 70 which contacts the surface of support tube 12 (FIG. 1), interlocking section 72 and connector extension 74 with bolt hole 76 and locking protrusion 84. In use, bearing half 20 interlocks with an identical second half at interlocking section 72 which has several surfaces which prevent movement except in one direction. Surface 78, for instance, prevents radially outward movement of the matching half, while surface 80 prevents radially inward movement and surface 82 prevents the halves from sliding through each other.

Therefore, when the halves slide together, a bolt is located through both holes 76 which are aligned and locking protrusion 84 is inserted into open end slot 17 in arm 16 (as seen in FIG. 1), they form a complete rigid bearing. Clearly, the configuration of the bearing makes it possible to remove and replace it without sliding it down the entire length of the support tube. All that is required is for the holding bolt to be removed and the halves separated by approximately their width, at which time each is free of the other and may be removed from the support tube.

In combination, the unified finger, split ring and wings of the tine of the invention, the simple support tube, and the unique bearing give the present invention benefits of light weight, high reliability, minimum crop entanglement and superior ease of assembly.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For instance, other interlocking patterns could be used on the bearing halves, or different screw shielding structures could be used on the tine, and a differently shaped locking protrusion 56 could be used.

Moreover, the holes in support tube 12 could be replaced by a rolled groove forming a recess that also interlocks with protrusion 56.

What is claimed as new and for which Letters Patent of the United States are desired to be secured is:

1. A one piece molded harvester reel tine for mounting on a support tube comprising:
   a split ring section forming a ring with a single split and with an interior diameter approximately equal to the outside diameter of a support tube onto which it is to be mounted, the split ring section including a connector section at which two end sections of the split ring meet to form the split, each end section having a through hole, with the two through holes in alignment when the two end sections are adjacent to each other and a flexible band section of a cross sectional configuration such that the band section will flex sufficiently to permit the two end sections to separate a distance greater than the diameter of the split ring when closed without permanently deforming the flexible band section wherein the flexible band section comprises a smooth continuous section of at least one-half the circumference of the split ring section;
   a finger section the base of which is protruding from the outside surface of the split ring section in an orientation approximately radial to the circle of the split ring section and in a location on the exterior of the split ring section approximately one quarter of the circumference of the split ring section away from the split in the split ring section; and
   a protrusion from the inside surface of the circle of the split ring section, extending inward from the split ring section at the location of the finger section, the protrusion having a dimension inward toward the center of the split ring section which is at least as great as the wall thickness of a support tube onto which the split ring section is to be mounted.

2. The harvester reel tine of claim 1 wherein the finger section includes a curvature such that the tip of the finger sections lies on a radius of the split ring section which is farther away from the connector section than is the radius of the location of the base of the finger section.

3. The harvester reel tine of claim 1 further including at least one wing section integral with the finger section base and extending along the length of the finger section and transversely out from the finger section on the sides of it to form a plane in which part of the finger section is included.

4. The harvester reel tine of claim 3 wherein there are a first and a second wing section which together span the distance between adjacent tines.

5. The harvester reel tine of claim 4 further including a first interlocking structure on the end of the first wing section which is most remote from the finger section and a mating structure on the end of the second wing section which is most remote from the finger section, a mating section operating to connect with a first interlocking structure.

6. The harvester reel tine of claim 5 wherein the first interlocking structure is a slot in the end of the first wing section.

7. The harvester reel tine of claim 5 further including at least one reinforcing section in each wing section, the reinforcing section comprising a section which is of greater thickness than the balance of the wing section wherein the reinforcing section in the first wing section includes a first interlocking means and the reinforcing means in the second wing section includes a second interlocking means and the first interlocking means is connectable to a second interlocking means on an identical tine.

8. A harvester reel tine and support tube assembly comprising:
   a support tube including a recess at a location prescribed for each tine;
   a one piece molded tine attached to the support tube and comprising:
   a split ring section forming a ring with a single split and with an interior diameter approximately equal to the outside diameter of a support tube onto which it is to be mounted, the split ring section including a connector section at which two end sections of the split ring meet to form the split, each end section having a through hole, with the two through holes in alignment when the two end sections are adjacent to each other and a flexible band section of a cross sectional configuration such that the band section will flex sufficiently to permit the two end sections to separate a distance greater than the diameter of the split ring when closed without permanently deforming the flexible band section wherein the flexible band section comprises a continuous section of at least one-half the circumference of the split ring section;

a finger section the base of which is protruding from the outside surface of the split ring section in an orientation approximately radial to the circle of the split ring section and in a location on the exterior of the split ring section approximately one quarter of the circumference of the split ring section away from the split in the split ring section; and a protrusion from the inside surface of the circle of the split ring section, extending inward from the split ring section at the location of the finger section, the protrusion having a dimension inward toward the center of the split ring section which extends it into the recess in the support tube onto which the split ring section is mounted by inserting the protrusion into the recess at the location on the support tube prescribed for a tine; and a fastener located in the connector section of the split ring section of the tine, fitted through the hole of one end section and attached to the hole of the other end section and compressing the end sections together to firmly attach the tine onto the support tube.

9. The harvester reel tine and support tube assembly of claim 8 further including at least one wing section integral with the finger section base and extending along the length of the finger section and transversely out from the finger section on the sides of it to form a plane in which part of the finger section is included.

10. The harvester reel tine and support tube assembly of claim 9 wherein each wing section of each tine has dimensions transverse to the tine such that, when assembled on the support tube, the wing section and tines form a continuous structure.

11. The harvester reel tine and support tube assembly of claim 8 further including a two piece molded plastic bearing holding the support tube, the bearing constructed of two identical halves, each half including an interlocking section located at one end of the half and a clearance hole and a locking protrusion on an extension at the other end of the half, the two halves being interlocked together at one end and held by a bolt through their holes at the other end.

* * * * *